April 21, 1959 L. F. HAMBLIN 2,883,208
TRACTOR-TRAILER LOAD DISTRIBUTING COUPLING
Filed July 27, 1955 4 Sheets-Sheet 1
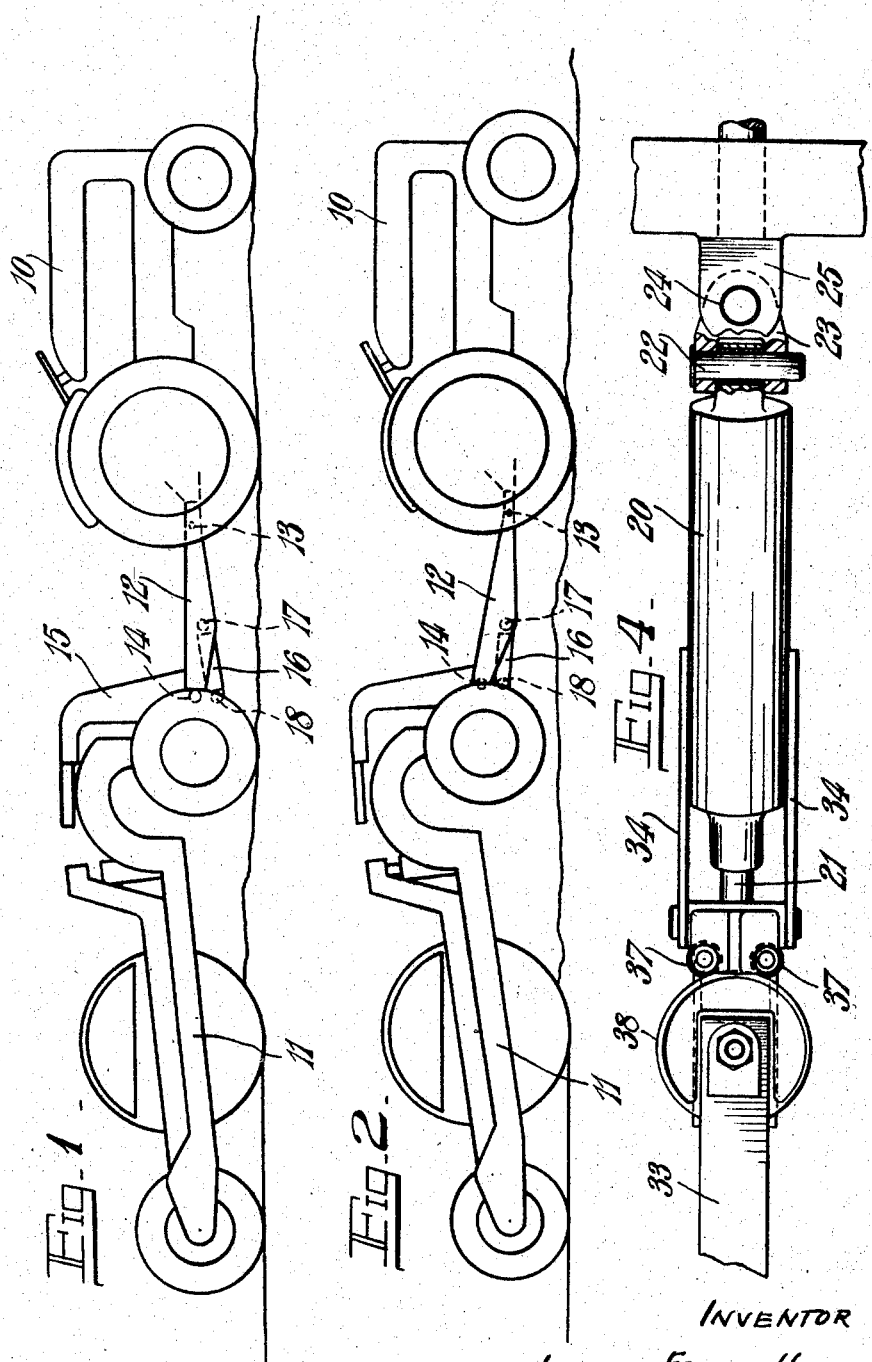
INVENTOR
LESLIE FRANK HAMLIN
by Walter S. Pleston
ATTORNEY

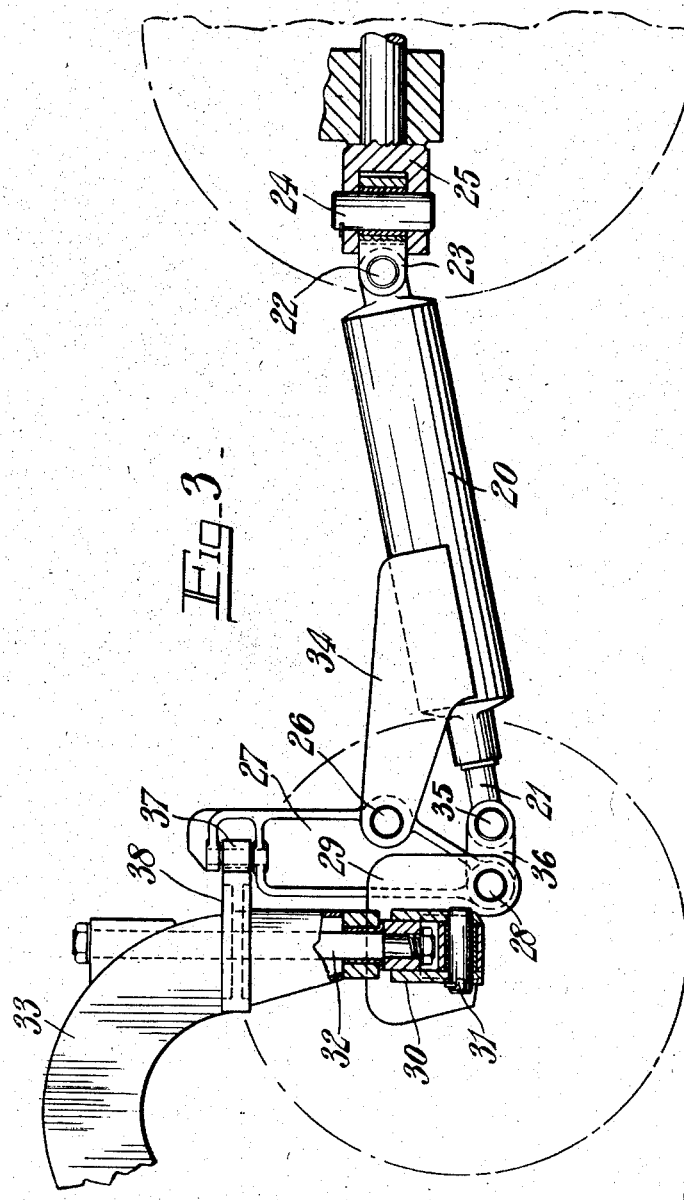

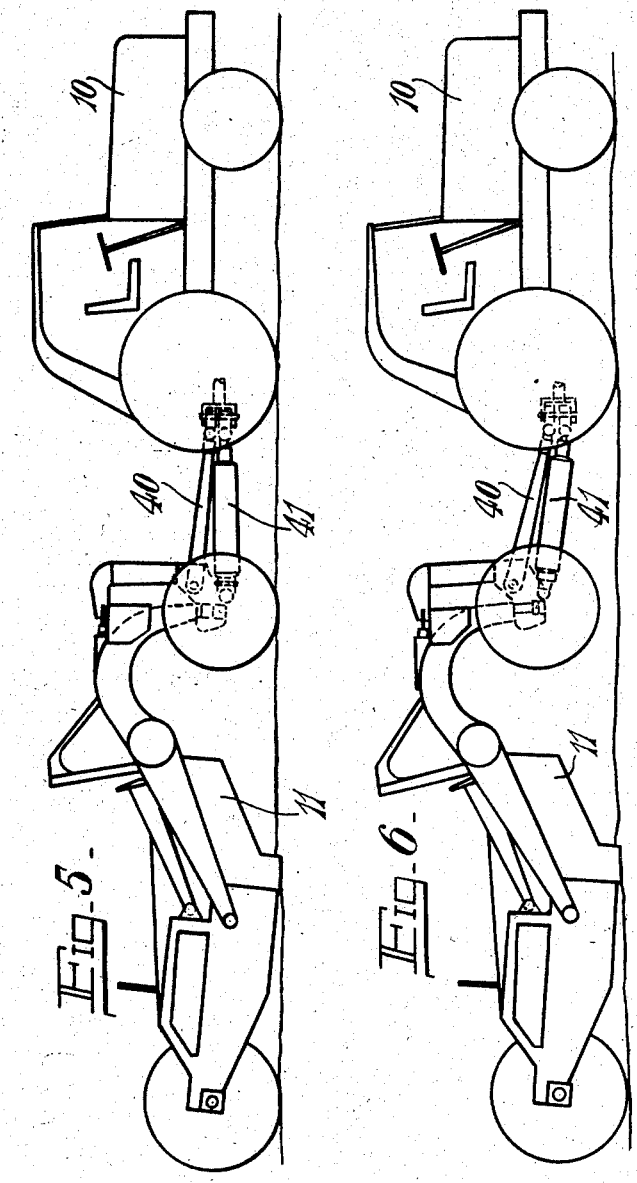

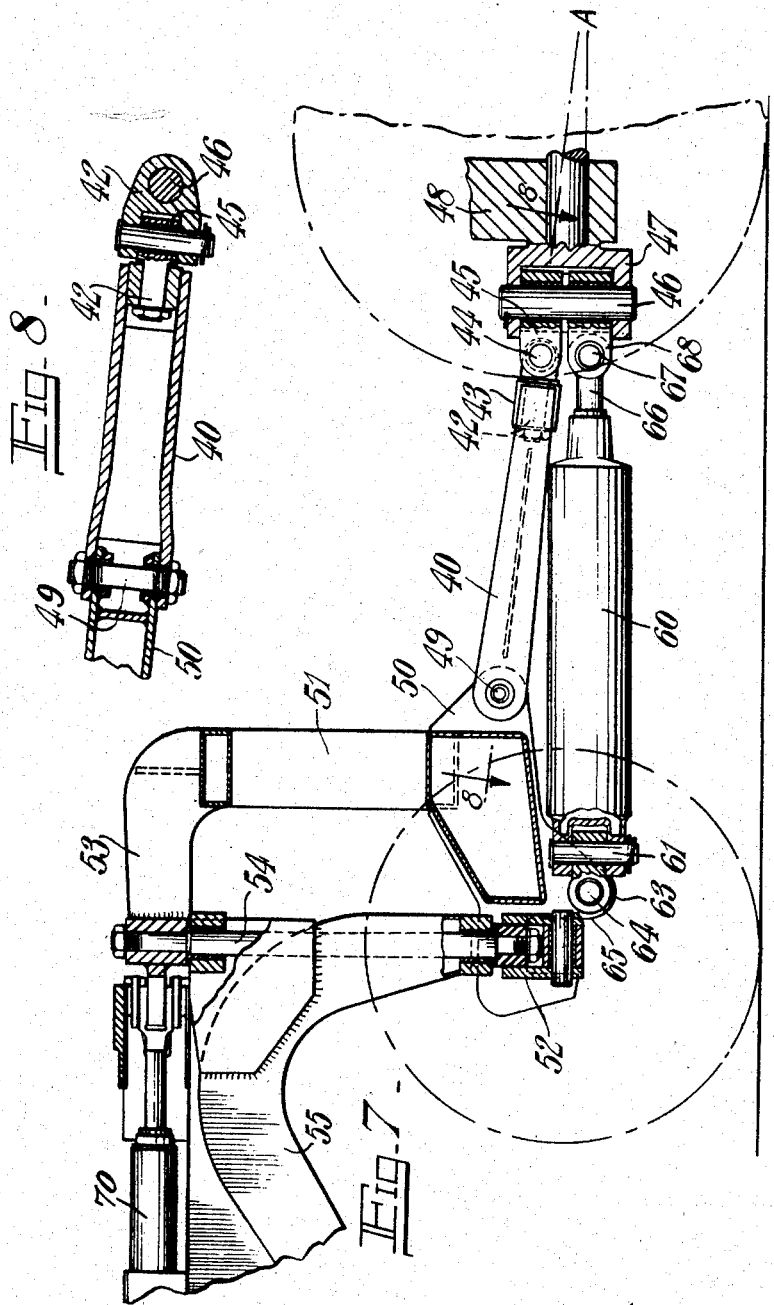

United States Patent Office 2,883,208
Patented Apr. 21, 1959

2,883,208

TRACTOR-TRAILER LOAD DISTRIBUTING COUPLING

Leslie Frank Hamblin, Marchamley, near Shrewsbury, England, assignor to Sentinel (Shrewsbury) Limited, Shrewsbury, England, a British company Application July 27, 1955, Serial No. 524,695

Claims priority, application Great Britain April 28, 1955

6 Claims. (Cl. 280—406)

This invention relates to improvements in vehicle couplings or hitches for coupling a towing vehicle such as a tractor to a trailer or other towed vehicle or implement, and refers particularly to couplings or hitches of the type incorporating means for transferring weight from the towed vehicle to the tractor to increase the adhesion of the tractor wheels and hence to obtain increased draw-bar pull under adverse conditions of terrain.

According to the invention a weight transferring coupling or hitch for a tractor-trailer combination comprises a coupling member or tow-bar of fixed length in combination with a fluid pressure ram, the tow-bar and ram being pivotally connected at their forward ends to the tractor and being pivotally connected at their rear ends at vertically spaced points to a member carried by or associated with the front axle of the trailer whereby energisation of the ram applies to the trailer a force acting to transfer from the trailer to the tractor a portion of the weight of the trailer proportional to the pressure applied to the ram.

The rear ends of the tow-bar and ram may be pivotally connected to vertically spaced points on a sub-assembly pivotally mounted about a horizontal axis on the front axle of the trailer and bearing at its upper end on the boom or king-post of the trailer at a point above the level of the front axle.

The term boom or king-post is intended herein to cover the forward end portion of the trailer in or on which the front axle of the trailer is mounted for angular movement about a vertical or rearwardly inclined axis. In the case of a scraper or similar implement the boom is usually of swan-neck or goose-neck form with a king-pin mounted in its forward downwardly extending portion for the front axle to move angularly about. The king-pin may be a single member of substantial length or may be formed by two axially spaced aligned members.

In another arrangement the tow-bar may be pivotally connected at its forward end to a fitting on the tractor and at its rear end to a sub-assembly carried by or associated with the front axle of the trailer while the ram is pivotally connected at its forward end to a point on the tractor below the tow-bar connection and at its rear end to a point on the sub-assembly below the tow-bar connection, the points of connection on the sub-assembly being spaced vertically at a greater distance than the points of connection on the tractor so that the tow-bar and ram diverge rearwardly. The lines of action of the tow-bar and the ram intersect at a point which is forward of the rear axle of the tractor so that when weight transference takes place the static distribution of load between the front and rear wheels of the tractor can be substantially maintained, particularly in the case of a tractor in which both front and rear wheels are driven.

When the vehicles are standing on level ground the tow-bar may be substantially horizontal while the ram is inclined downwardly towards its connection to the trailer, or the ram may be substantially horizontal while the tow-bar is inclined upwardly towards its connection to the trailer, or both may be inclined in opposite directions to the horizontal.

The connection between the front end of the tow-bar and the tractor is conveniently so arranged as to allow for relative angular movement about a longitudinal axis between the vehicles on rough ground.

Alternatively both the tow-bar and the ram may be connected by vertically spaced horizontal pivot pins to a fitting which is angularly movable about a longitudinal axis on the tractor.

Some practical embodiments of the invention are illustrated by way of example in the accompanying drawings, in which:

Figures 1 and 2 are diagrammatic side elevations of a tractor and trailer combination showing the trailer respectively in the positions of no weight transference and maximum weight transference;

Figure 3 is a side elevation in part section of one practical form of coupling;

Figure 4 is a plan of Figure 3;

Figures 5 and 6 are diagrammatic side elevations of a tractor and trailer combination with a modified form of coupling, Figure 5 showing the trailer in the position of no weight transference and Figure 6 showing it in the position of maximum weight transference;

Figure 7 is a side elevation on a larger scale in part section of the coupling shown in Figures 5 and 6;

Figure 8 is a fragmentary section on the line 8—8 of Figure 7.

In the diagrams forming Figures 1 and 2 of the drawings, 10 is a four-wheeled tractor and 11 is a trailer which in this case is a scraper of known type. The coupling comprises a rigid tow-bar 12 pivotally connected to the tractor at a point 13 below and behind the rear axle of the tractor and pivotally connected at its rear end to a point 14 on a sub-assembly 15 associated with the front axle of the scraper. The front end of the hydraulic cylinder and ram assembly 16 is pivotally connected at 17 to the tow-bar and its rear end is connected to the sub-assembly 15 at a point 18 below the connection 14. When the cylinder and ram assembly is shortened by pressure liquid from a pump on the tractor a lifting force is applied to the front end of the trailer to the tractor until in the limiting position the front wheels of the trailer are lifted clear of the ground as shown in Figure 2 and the whole of the load normally carried by these wheels is transferred to the tractor.

In the practical form of coupling shown in Figures 3 and 4, 20 is a hydraulic cylinder in which works a piston having a piston-rod 21 extending through a gland at the rear end of the cylinder.

The front end of the cylinder is pivotally connected by a horizontal pin 22 to a member 23 which is itself pivotally coupled by a vertical pin 24 to a jaw 25 mounted to swivel about a longitudinal horizontal axis on the tractor. Upwardly and rearwardly extending plates 34 are welded to each side of the cylinder 20 at its rear end and the extremities of these plates are pivotally connected by a transverse horizontal pin 26 to a sub-assembly 27 of which the lower end is pivotally mounted on a transverse horizontal pin 28 in a fitting 29 fixed on the front axle 30 of the scraper. The outer end of the piston-rod 21 is pivotally connected by a horizontal pin 35 to the forward end of a short link 36 pivotally mounted on the pin 28. The pin 26 lies a substantial distance above the pin 28 and above the level of the axle 30. The axle is adapted to rock transversely about a horizontal pivot 31 and to swivel for steering about a vertical king-pin 32 mounted in the swan-neck 33 of the scraper.

At the upper end of the sub-assembly 27 there is a housing for a pair of transversely spaced rollers 37 rotating on vertical axes and adapted to engage and roll on the peripheral surface of a part-circular member 38 fixed to the swan-neck 33, the periphery of the member being concentric about the king-pin 32.

When pressure fluid is admitted to the rear end of the cylinder 20 the piston-rod 21 is urged forwardly, thereby pivoting the sub-assembly 27 counterclockwise (as seen in Fig. 3) about the axis of the pin 28 to force the rollers 37 against the member 38 on the swan-neck of the scraper. The front end of the trailer is thus raised, whereby the load on the front wheels is reduced and transferred from the scraper to the tractor to an extent dependent on the pressure in the cylinder.

The weight transference is not affected by steering articulation of the scraper relative to the tractor as the sub-assembly 27 is free to move angularly with the scraper axle about the king-pin 32, the rollers 37 rolling around the surface of the member 38.

In the hitch illustrated in Figures 3 and 4 the body of the hydraulic cylinder 20 with the plates 34 forms a rigid tow-bar of fixed length connecting the scraper to the tractor and taking the tractive effort while the cylinder and piston form a ram of variable length for effecting weight transfer.

In the construction shown diagrammatically in Figures 5 and 6 and in detail in Figures 7 and 8 the tractor 10 and a scraper 11 are coupled together by a tow-bar 40 and a separate hydraulic cylinder and ram assembly 41.

The tow-bar, which is a rigid hollow built-up member, has a swivelling connection at its front end with a horizontal pin 42 projecting rearwardly from a fitting 43 pivotally mounted on a horizontal pin 44. That pin is anchored at its ends in a forked fitting 45 which is itself free to swivel about a vertical pin 46 mounted in a bracket 47 which is mounted for angular movement about a horizontal longitudinal axis in a rigid anchorage 48 on the tractor. This allows for relative angular movement about a longitudinal axis between the vehicles on rough ground.

In an alternative arrangement the bracket 47 is fixed on the tractor and the forward end of the tow-bar 40 is coupled to the fitting 43 in such a manner as to permit relative swivelling movement between the tow-bar and that fitting.

At its rear end the tow-bar is connected by a horizontal transverse pin 49 to lugs 50 projecting forwardly from a sub-assembly 51 mounted on the front axle of the scraper, the pin 49 being located at a point slightly above the level of the front axle 52 of the scraper. The sub-assembly 51 is a built-up member fixed at its lower end to the front axle 52 and having at its upper end a rearward extension 53 which receives the upper end of the king-pin 54 which is mounted in the swan-neck 55 of the scraper and forms the pivot about which the front axle of the scraper moves for steering.

In a modification the lower end of the sub-assembly may be mounted on the lower end of the king-pin in which case the front axle of the scraper will be mounted in the lower end of the sub-assembly for rocking movement about a longitudinal horizontal pin.

Lying below the tow-bar is an hydraulic cylinder 60 which at its rear end is pivotally connected by a vertical pin 61 to a fitting 63 mounted for swivelling on a transverse horizontal pin 64 fixed in downwardly projecting lugs 65 on the sub-assembly 51, the axis of the pin 64 lying below the front axle of the scraper and a substantial distance below the pin 49. A piston working in the cylinder has a piston-rod 66 extending through a gland in the front end of the cylinder and the forward end of the piston-rod is coupled by a horizontal pin 67 to a forked fitting 68 adapted to swivel about the vertical pin 46 on the tractor, the fitting 68 lying immediately below the fitting 45 to which the tow-bar is connected and both fittings being located between vertically spaced walls of the bracket 47 in which the pin 46 is mounted. The position of the ram may of course be reversed, the cylinder being pivotally connected to the pin 67 on the tractor and the piston-rod to the pin 61 on the sub-assembly 51.

It will be appreciated from the drawings that the points of connection of the tow-bar and of the hydraulic ram to the sub-assembly on the scraper are spaced vertically at a greater distance than the points of connection to the tractor so that the tow-bar and ram diverge rearwardly, and their lines of action intersect at a point A (Figure 7) which is forward of the rear axle of the trailer so that when weight transference takes place the static distribution of load between the front and rear wheels of the tractor can be substantially maintained. This is of particular advantage in the case of a tractor in which both front and rear wheels are driven.

When the vehicles are standing on level ground as shown in Figure 5, the tow-bar may be substantially horizontal or inclined upwardly towards its connection to the scraper while the ram is substantially horizontal or is inclined downwardly towards its connection to the scraper.

When the hydraulic ram is shortened by admitting pressure fluid to its forward end a force is applied to the sub-assembly on the scraper tending to lift the front end of the scraper and so to transfer weight from the scraper to the tractor until, if the pressure applied is sufficient, the front wheels of the scraper are lifted clear of the ground as shown in Figure 6 and the whole of the load normally carried by the front wheels of the scraper is transferred to the tractor.

When a tractor is towing a trailer up a slope there is a certain transference of weight from the front to the rear wheels of the tractor and by transferring weight from the trailer by the means described above the weight distribution between the front and rear wheels of the tractor can be restored substantially to its normal ratio so that maximum traction can be obtained.

The ability to lift the front wheels of the trailer off the ground is of great advantage if the combination has to be backed for any distance as it allows the combination to be handled like a normal articulated six-wheeled vehicle.

The pressure fluid supplied to the ram in any of the couplings or hitches described above may be air but normally it will be a liquid such as oil supplied by a pump driven by the engine of the tractor, the pressure applied to the ram cylinder being controlled by the driver through any convenient form of control according to the amount of weight transference required.

When the pressure in the ram cylinder is relived transference of weight ceases and the coupling functions as a normal draw-bar transmitting purely tractive forces.

To prevent excessive loading of the towing vehicle when traversing uneven ground a controllable spring-loaded relief valve may be arranged in the line connecting the ram cylinder to the source of liquid under pressure so that the pressure and hence the weight transference will remain constant irrespective of the attitude of the hitch and of the volume of liquid in the circuit.

Figure 7 shows at 70 a ram which when weight transference takes place exerts a force controlling the steering movements of the trailer axle in proportion to the weight transferred but this forms no part of the present invention and forms the subject of a co-pending patent application.

I claim:

1. A weight transferring coupling for a tractor-trailer combination, the trailer having a front axle and a king-post, comprising a substantially vertical sub-assembly mounted on said front axle of the trailer for pivotal movement about a vertical axis defined by said king-post, said sub-assembly engaging at its upper end with said king-post at a point above the level of said front axle, a tow-bar of fixed length pivotally connected at its front end to the tractor and at its rear end to said sub-assembly, and a fluid-pressure ram pivotally connected at its front end to said tractor at a point below the tow-bar connection and pivotally connected at its rear end to said sub-assembly at a point below the connection thereto of said tow-bar, the connections of said ram and tow-bar to said sub-assembly being spaced vertically from each other a distance greater than the connections of said ram and tow-bar to said tractor, and the lines of action of said tow-bar and said ram intersecting at a point located forwardly of the rear axle of said tractor.

2. A weight transferring coupling for a tractor-trailer combination as in claim 1, the rear end of said ram being connected to said sub-assembly at a point below the level of said front axle, and the rear end of said tow-bar being connected to said sub-assembly at a point above the level of said front axle.

3. A weight transferring coupling for a tractor-trailer combination as in claim 1, a member mounted on said tractor and angularly movable about a longitudinal axis, and a pair of fittings mounted in said member for angular movement about a common vertical axis, said front ends of said ram and tow-bar being pivotally connected to said fittings, respectively.

4. A weight transferring coupling for a tractor-trailer combination as in claim 1, a king-pin mounted in said king-post and defining the vertical steering axis for said front axle of said trailer, said sub-assembly being connected at its lower end to said front axle and at its upper end to the upper end of said king-pin.

5. A weight transferring coupling for a tractor-trailer combination, the trailer having a front axle swivelling about an axis for steering, comprising a sub-assembly mounted on the front axle of the trailer, a tow-bar of fixed length pivotally connected at its rear end to the sub-assembly, a fluid pressure ram pivotally connected at its rear end to the sub-assembly at a point below the connection of the tow-bar, a member mounted on the tractor and angularly movable about a longitudinal axis, and a pair of fittings mounted in said member for angular movement about a common vertical axis, the front ends of said tow-bar and said ram, that of the ram below that of the tow-bar being pivotally connected to said fittings, respectively, the connections to the sub-assembly being spaced from each other a vertical distance greater than the connections to said fittings and the line of action of the tow-bar and ram intersecting at a point forward of the rear axle of the tractor.

6. A weight-transferring coupling for a tractor-trailer combination wherein said trailer is equipped with a front axle, a king post and a king pin therein to define the steering axis for said front axle, comprising a sub-assembly mounted on and being connected at its lower end to said front axle of the trailer and being connected at its upper end to the upper end of said king pin about which the front axle swivels for steering, a tow-bar of fixed length pivotally connected at its front end to the tractor and at its rear end to said sub-assembly, and a fluid-pressure ram pivotally connected at its front end to a point on the tractor below the tow-bar connection and pivotally connected at its rear end to said sub-assembly at a point below the connection of said tow-bar, the connections to the sub-assembly being spaced from each other a vertical distance greater than the connections to the tractor and the lines of action of said tow-bar and said ram intersecting at a point forward of the rear axle of the tractor.

References Cited in the file of this patent
UNITED STATES PATENTS

| | | |
|---|---|---|
| 2,360,901 | Simmons | Oct. 24, 1944 |
| 2,382,449 | Simmons | Aug. 14, 1945 |
| 2,459,098 | Simmons | Jan. 11, 1949 |
| 2,599,993 | Hill et al. | June 10, 1952 |
| 2,718,410 | Simmons | Sept. 20, 1955 |